United States Patent
Cho et al.

(10) Patent No.: US 11,570,855 B2
(45) Date of Patent: Jan. 31, 2023

(54) INDUCTION HEAT COOKING APPARATUS

(71) Applicant: LG ELECTRONICS INC., Seoul (KR)

(72) Inventors: Bong Jin Cho, Seoul (KR); Jinwook Han, Seoul (KR); Seongho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 16/477,753

(22) PCT Filed: Jan. 5, 2018

(86) PCT No.: PCT/KR2018/000296
§ 371 (c)(1),
(2) Date: Jul. 12, 2019

(87) PCT Pub. No.: WO2018/131844
PCT Pub. Date: Jul. 19, 2018

(65) Prior Publication Data
US 2019/0387585 A1 Dec. 19, 2019

(30) Foreign Application Priority Data
Jan. 12, 2017 (KR) .......................... 10-2017-0005543

(51) Int. Cl.
*H05B 6/06* (2006.01)
*H05B 6/04* (2006.01)
(Continued)

(52) U.S. Cl.
CPC ............... *H05B 6/065* (2013.01); *H05B 6/04* (2013.01); *H05B 6/12* (2013.01); *G05B 9/02* (2013.01); *G05B 9/03* (2013.01)

(58) Field of Classification Search
CPC ........ H05B 6/065; H05B 6/1272; H05B 6/06; H05B 6/04; H05B 6/12; G05B 9/02; G05B 9/03
See application file for complete search history.

(56) References Cited

U.S. PATENT DOCUMENTS

| 10,959,296 B2* | 3/2021 | Yun ...................... H05B 6/1236 |
| 2005/0199614 A1* | 9/2005 | Uchida .................. H05B 6/145 |
| | | 219/662 |

(Continued)

FOREIGN PATENT DOCUMENTS

| CN | 1631056 | 6/2005 |
| CN | 201252672 | 6/2009 |

(Continued)

OTHER PUBLICATIONS

Extended European Search Report in European Appln. No. 18739009.1, dated Jul. 16, 2020, 31 pages.

(Continued)

*Primary Examiner* — John J Norton
*Assistant Examiner* — Franklin Jefferson Wang
(74) *Attorney, Agent, or Firm* — Fish & Richardson P.C.

(57) ABSTRACT

The present invention relates to an induction heating cooker including a synchronization circuit for a plurality of inverters, comprising: a first inverter including a first switching circuit unit for applying a first power source to a first heating coil, and a first control unit for controlling the first switching circuit unit; and a second inverter including a second switching circuit unit for applying a second power source to a second heating coil, and a second control unit for controlling the second switching circuit unit, wherein the first inverter further includes a first insulated signal transfer unit for controlling an operation of the second switching circuit unit, and the first control unit may match an operating frequency of the second switching circuit unit with an operating (Continued)

frequency of the first switching circuit unit by using the first insulated signal transfer unit.

13 Claims, 7 Drawing Sheets

(51) Int. Cl.
*H05B 6/12* (2006.01)
*G05B 9/02* (2006.01)
*G05B 9/03* (2006.01)

(56) References Cited

U.S. PATENT DOCUMENTS

| | | | | |
|---|---|---|---|---|
| 2006/0162986 | A1* | 7/2006 | Disser | G06F 11/1633 180/402 |
| 2006/0237449 | A1 | 10/2006 | Uchida et al. | |
| 2006/0237450 | A1 | 10/2006 | Uchida et al. | |
| 2006/0289494 | A1* | 12/2006 | Fishman | H05B 6/40 219/663 |
| 2007/0125771 | A1 | 6/2007 | Uchida et al. | |
| 2009/0139980 | A1* | 6/2009 | Acero Acero | H05B 6/065 219/489 |
| 2011/0253706 | A1 | 10/2011 | Wang et al. | |
| 2012/0248098 | A1* | 10/2012 | Lee | H05B 6/1272 219/660 |
| 2013/0008895 | A1* | 1/2013 | Todd | H05B 6/666 219/715 |
| 2013/0206750 | A1* | 8/2013 | Anton Falcon | H05B 6/062 219/622 |
| 2014/0183184 | A1 | 7/2014 | Oh et al. | |
| 2015/0034630 | A1* | 2/2015 | Fuchs | A47J 36/2483 219/667 |
| 2016/0374152 | A1 | 12/2016 | Oh et al. | |
| 2017/0223780 | A1* | 8/2017 | Heo | H05B 6/1272 |
| 2017/0246816 | A1* | 8/2017 | Hopkins | B29C 35/02 |

FOREIGN PATENT DOCUMENTS

| | | | | |
|---|---|---|---|---|
| CN | 103181238 | A * | 6/2013 | H05B 6/1272 |
| CN | 103699461 | | 4/2014 | |
| CN | 104039033 | | 9/2014 | |
| CN | 105722261 | | 6/2016 | |
| CN | 106165531 | | 11/2016 | |
| EP | 1943878 | | 7/2008 | |
| EP | 2405710 | | 1/2012 | |
| EP | 2753145 | | 7/2014 | |
| JP | H08213163 | A * | 8/1996 | |
| JP | H08213163 | A * | 8/1996 | H05B 6/065 |
| JP | H08213163 | A * | 9/1996 | |
| JP | 2004319296 | | 11/2004 | |
| JP | 2008270088 | | 11/2008 | |
| JP | 2010140657 | | 6/2010 | |
| JP | 5844017 | | 11/2015 | |
| KR | 1020070026856 | | 3/2007 | |
| KR | 100723729 | | 5/2007 | |
| KR | 1020110092069 | | 8/2011 | |
| KR | 1020110092073 | | 8/2011 | |

OTHER PUBLICATIONS

Office Action in Chinese Appln. No. 201880006842.4, dated Jul. 15, 2021, 24 pages (with English translation).
Notice of Allowance in Chinese Appln. No. 201880006842.4, dated Mar. 9, 2022, 10 pages (with English translation).
CN Office Action in Chinese Appln. No. 201880006842.4, dated Feb. 2, 2021, 22 pages (with English translation).

* cited by examiner

INDUCTION HEAT COOKING APPARATUS

CROSS-REFERENCE TO RELATED APPLICATIONS

This application is a National Stage application under 35 U.S.C. § 371 of International Application No. PCT/KR2018/000296, filed on Jan. 5, 2018, which claims the benefit of Korean Application No. 10-2017-0005543, filed on Jan. 12, 2017. The disclosures of the prior applications are incorporated by reference in their entirety.

TECHNICAL FIELD

The present disclosure relates to an induction heat cooking apparatus including a synchronization circuit for a plurality of inverters, and more particularly, to an induction heat cooking apparatus in which one controller controls a plurality of switching circuits to match operating frequencies and phases of operation of heating coils.

BACKGROUND ART

Generally, an induction heat cooking apparatus is an electric cooking apparatus that performs a cooking function by applying a high frequency current to a working coil or a heating coil to allow an eddy current to flow to heat a cooking container while a line of strong magnetic force generated by the high frequency current passes through the cooking container.

In a basic heating principle of the induction heat cooking apparatus, as a current is applied to a heating coil, a cooking container which is made of a magnetic substance generates heat due to induction heating, and the cooking container is heated by the generated heat as described above to cook items disposed therein.

An inverter used for an induction heat electric apparatus switches a voltage applied to a heating coil to allow a high frequency current to flow through the heating coil. The inverter is configured to drive a switching element formed of an insulated gate bipolar transistor (IGBT) to allow the high frequency current to flow through the heating coil to form a high frequency magnetic field at the heating coil.

When two heating coils are provided in the induction heat cooking apparatus, two inverters are required to simultaneously operate the two heating coils. However, when one container is heated at the same time using two inverters, inconsistency between operating frequencies and phases of operation of the two heating coils may occur.

In this case, there is a problem that noise is generated due to inconsistency of the operating frequencies and an output deviation occurs due to a phase deviation, in the induction heat cooking apparatus.

DISCLOSURE

Technical Problem

The present disclosure provides an induction heat cooking apparatus capable of matching operating frequencies and phases of operation of a plurality of heating coils by controlling, by single controller, a switching circuit included in a plurality of inverters.

The present disclosure further provides an induction heat cooking apparatus capable of performing a fail-safe function for error operation of the inverter by controlling, by the controller of a normally operating inverter, a switching circuit included in the inverter in which abnormality occurs, when the abnormality in any one of a plurality of inverters occurs.

The objects of the present disclosure are not limited to the above-mentioned objects, and other objects and advantages of the present disclosure which are not mentioned may be understood by the following description and more clearly understood by the embodiments of the present disclosure. It will also be readily understood that the objects and advantages of the invention may be realized by means defined in the appended claims and a combination thereof.

Technical Solution

According to an embodiment of the present disclosure, an induction heat cooking apparatus includes a first inverter including a first switching circuit that applies first power to a first heating coil and a first controller that controls the first switching circuit, and a second inverter including a second switching circuit that applies the second power to the second heating coil and a second controller that controls the second switching circuit, and the first inverter further includes a first insulated signal transmitter that controls operation of the second switching circuit, and the first controller matches operating frequency of the second switching circuit with operating frequency of the first switching circuit using the first insulated signal transmitter.

According to another embodiment of the present disclosure, an induction heat cooking apparatus includes a first inverter including a first switching circuit that applies the first power to a first heating coil, a first controller that controls the first switching circuit, and a first insulated signal transmitter that is controlled by the first controller, and a second inverter including a second switching circuit that applies the second power to the second heating coil, a second controller that controls the second switching circuit, and a second insulated signal transmitter that is controlled by the second controller, and when the first inverter and the second inverter operate simultaneously, the second switching circuit is controlled by the first controller through the first insulated signal transmitter, and the second controller may stop controlling the second switching circuit.

Further, when an error occurs in the first controller or the first insulated signal transmitter, the first switching circuit may be controlled by the second controller through the second insulated signal transmitter.

Advantageous Effects

According to the present disclosure, an induction heat cooking apparatus may control, by a single controller, a switching circuit included in a plurality of inverters so that it is possible to match operating frequencies and phases of operation of a plurality of heating coils. Thus, it is possible to eliminate noise generated by the plurality of coils operating at different frequencies from each other, and to improve an output deviation of the plurality of coils due to phase deviation. Further, quietness of the induction heat cooking apparatus may be improved, and output and operation stability of the induction heat cooking apparatus may be improved.

Further, according to the present disclosure, when abnormality occurs in any one of the plurality of inverters, the induction heat cooking apparatus may perform a fail-safe function for error operation of the inverter by controlling, by the controller of a normally operating inverter, a switching circuit included in the inverter in which the abnormality occurs. Therefore, even when failure occurs in a controller of any one of the plurality of inverters, as the induction heat cooking apparatus normally operates, repair cost may be reduced and operation stability of the induction heat cooking apparatus may be improved, thereby enhancing satisfaction of consumers.

BEST MODE

Terms or words used in the present disclosure and claims are not to be construed as being limited to general and dictionary meanings and should be interpreted as meanings or concepts that meet the technical idea of the present disclosure based on the principle that the inventor can properly define the concept of the terms to describe his own invention in a best way. Further, a configuration shown in the embodiments and figures disclosed herein is a preferable embodiment and does not represent all the technical ideas of the present disclosure. Therefore, it should be understood that various equivalents and modifications that can replace them may be made at the filing of the present disclosure.

Hereinafter, an induction heat cooking apparatus according to an embodiment of the present disclosure will be described in detail with reference to the drawings.

Figure 1:
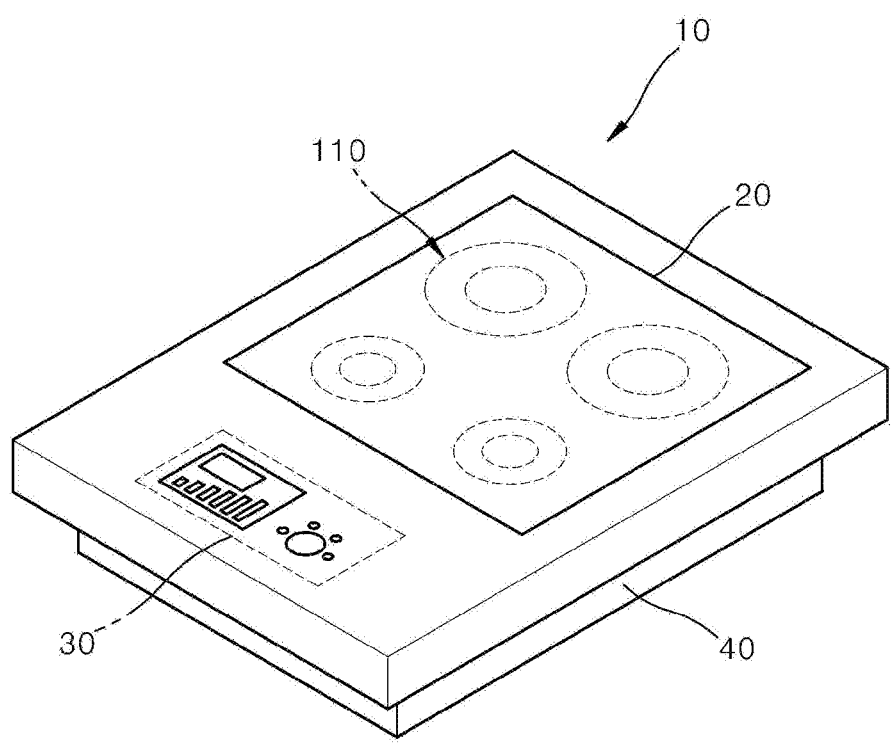
FIG. 1 is a perspective view of an induction heat cooking apparatus according to some embodiments of the present disclosure.

FIG. 1 is a perspective view of an induction heat cooking apparatus according to some embodiments of the present disclosure.

Referring to FIG. 1, the induction heat cooking apparatus according to some embodiments of the present disclosure includes a main body housing 10, a cooking plate 20, a user interface 30, and a driving circuit 40.

The cooking plate 20 on which a container may be placed may be placed on the main body housing 10. The user interface 30 that receives input from a user and displays information on a state of the induction heat cooking apparatus may be placed at one side of the upper surface of the main body housing 10 and the driving circuit 40 of the induction heat cooking apparatus may be located under the main body housing 10. However, the present disclosure is not limited thereto.

A plurality of heating coils 110 that are provided below the cooking plate 20 and provide a heat source to the cooking plate 20 are provided inside of the main body housing 10. The heating coils 110 may be placed below the cooking plate 20 throughout all surfaces of the cooking plate 20. The heating coils 110 may include a dual heating coil including an inner coil and an outer coil, which are separate from each other, and a single heating coil. However, the present disclosure is not limited thereto.

The driving circuit 40 that drives the heating coils 110 may be placed under the cooking plate 20. Details of the driving circuit 40 will be described below.

The user interface 30 that controls the heating coils 110 may be placed at one side of an upper portion of the main body housing 10. The user interface 30 may include an operation including a plurality of operation buttons that receives a command from a user and a display that displays information related to an operation state of the induction heat cooking apparatus. However, the user interface 30 shown in FIG. 1 is only one embodiment of the present disclosure, and the present disclosure is not limited thereto, but may be modified with various embodiments and used.

The user places the container on the cooking plate 20 and then sets a power level of the heating coil 110 above which the container is placed, by pressing the operation button included in the user interface 30, so that a high frequency power corresponding to the power level thereof may be supplied to the heating coil 110.

Hereinafter, a structure and operation of the driving circuit 40 that supplies the high-frequency power to the heating coil 110 will be described in detail.

Figure 2:
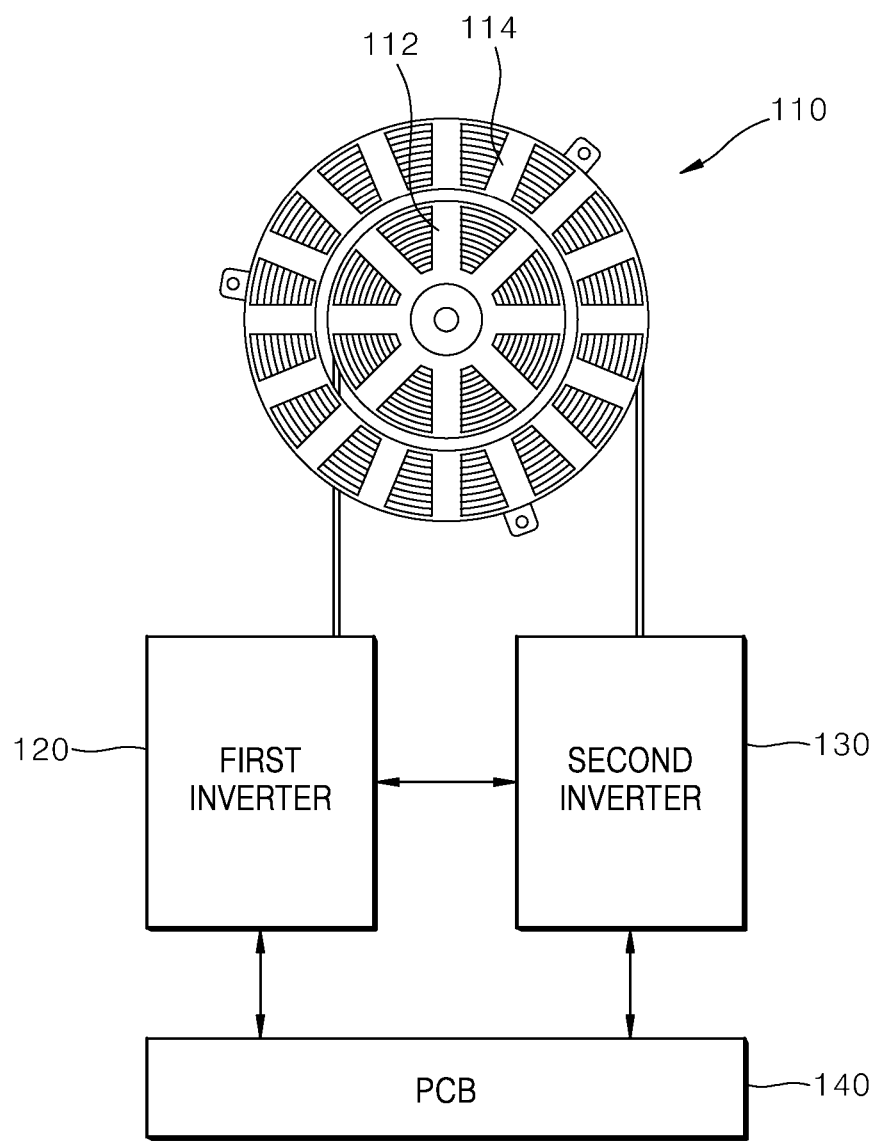
FIG. 2 is a block diagram of a driving circuit of the induction heat cooking apparatus that operates a heating coil of FIG. 1.

FIG. 2 is a block diagram of a driving circuit of the induction heat cooking apparatus that operates the heating coil of FIG. 1.

Referring to FIG. 2, a driving circuit 40 of an induction heat cooking apparatus according to an embodiment of the present disclosure includes a heating coil 110, a first inverter 120, a second inverter 130, and a PCB 140.

The heating coil 110 includes a first heating coil 112 and a second heating coil 114.

A high-frequency power may be applied to each of the first heating coil 112 and the second heating coil 114. That is, the first heating coil 112 and the second heating coil 114 may operate with different powers from each other. Thus, maximum output of the heating coil 110 may be a sum of the maximum outputs that respective heating coils may generate.

At this time, the first heating coil 112 may be placed inside of the heating coil 110, and the second heating coil 114 may be placed outside of the heating coil 110. Thus, the second heating coil 114 may be placed outside of the first heating coil 112 and circumference of the second heating coil 114 may be greater than that of the first heating coil 112.

The first heating coil 112 and the second heating coil 114 may be spaced apart from each other and may operate electrically in a separate manner. Further, the first heating coil 112 and the second heating coil 114 may be operated by different power from each other.

The first inverter 120 may control the operation of the first heating coil 112. Further, the first inverter 120 may provide the first heating coil 112 with operation power. For example, the first inverter 120 may provide the first heating coil 112 with a first power.

Likewise, the second inverter 130 may control the operation of the second heating coil 114. Further, the second inverter 130 may provide the second heating coil 114 with the operation power. For example, the second inverter 130 may provide the second heating coil 114 with a second power different from the first power.

The second inverter 130 may include substantially the same structure as the first inverter 120.

The PCB 140 may control the first heating coil 112 and the second heating coil 114. The PCB 140 may receive information on the state regarding each operation from the first inverter 120 and the second inverter 130. Further, the PCB 140 may serve as a bridge for exchanging data between the first inverter 120 and the second inverter 130.

For example, the PCB 140 may receive information on the state of the operation of the second heating coil 114 received from the second inverter 130 and provide the first inverter 120 with the received information and may operate in reverse order. However, the present disclosure is not limited thereto.

The first inverter 120 and the second inverter 130 operate independently of each other and may be electrically separated from each other. However, the first inverter 120 and the second inverter 130 may exchange data with each other through an insulated signal transmitter (e.g., a phototransistor and a photodiode). Details thereof will be described below.

Figure 3:
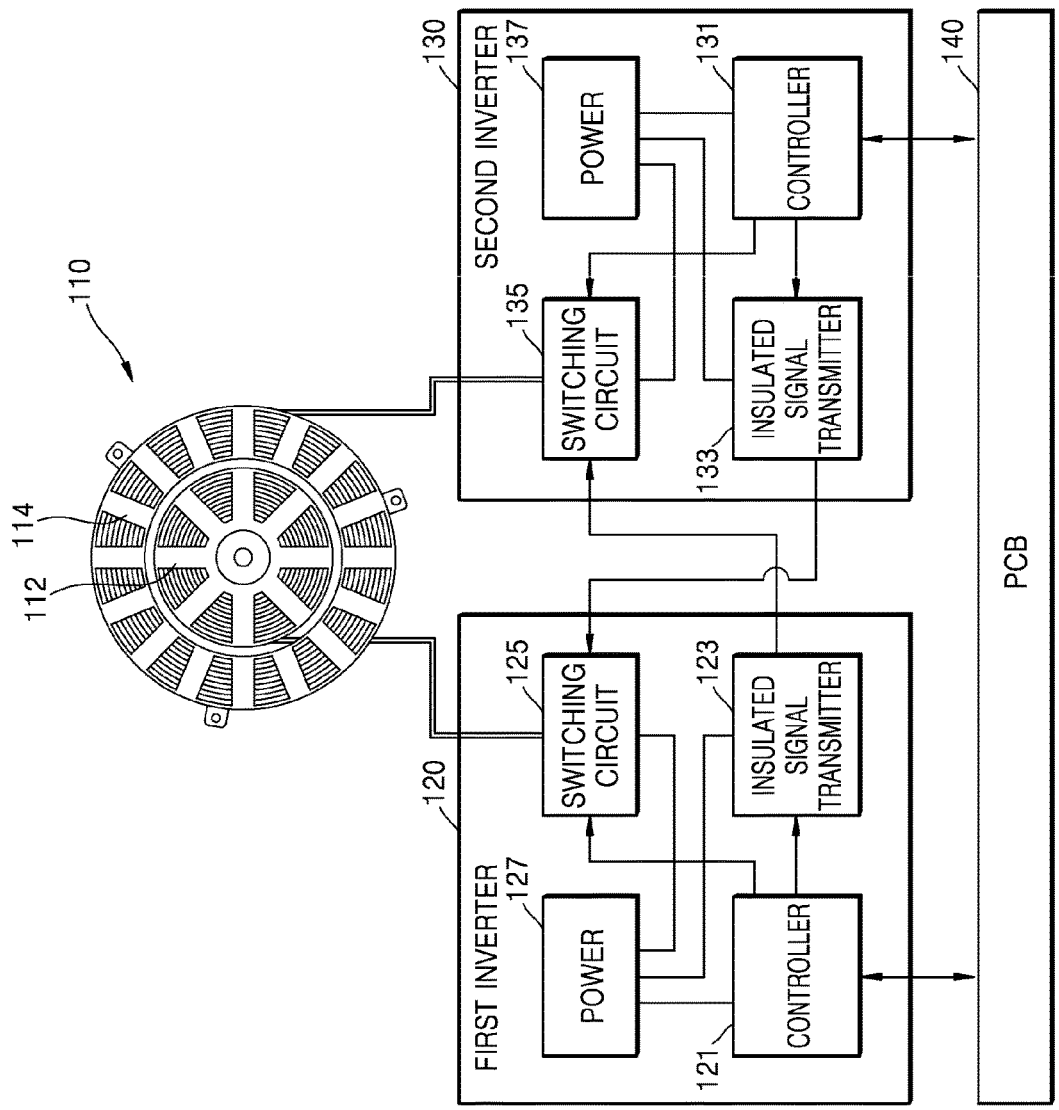
FIG. 3 is a block diagram specifically illustrating components of an induction heat cooking apparatus according to some embodiments of the present disclosure.

FIG. 3 is a block diagram specifically illustrating components of an induction heat cooking apparatus according to some embodiments of the present disclosure.

Referring to FIG. 3, in the induction heat cooking apparatus according to some embodiments of the present disclosure, a first inverter 120 operates a first heating coil 112, and a second inverter 130 operates a second heating coil 114.

Specifically, the first inverter 120 includes a first controller 121, a first insulated signal transmitter 123, a first switching circuit 125, and a first power 127.

The first controller 121 controls operations of the first insulated signal transmitter 123 and the first switching circuit 125. The first controller 121 may be operated by receiving the first power from the first power 127. The first controller 121 may receive information on the state of the other heating coils from a PCB 140.

Specifically, the first controller 121 controls the first switching circuit 125 to determine whether the first heating coil 112 operates and controls the operating frequency and the phase of the operation of the first heating coil 112. The first controller 121 may adjust the operating frequency or the phase of the operation of the first switching circuit 125 based on the information on the state received from the PCB 140.

Further, the first controller 121 may transmit the control signal of the second heating coil 114 to a second switching circuit 135 through the first insulated signal transmitter 123. Accordingly, the first controller 121 may determine whether the second heating coil 114 is operated, and may control the operating frequency and the phase of the operation of the second heating coil 114. However, in this case, the second switching circuit 135 operates using the control signal of the first controller 121 in preference to the control signal of the second controller 131. Details thereof will be described below.

The first insulated signal transmitter 123 may transmit the control signal received from the first controller 121 to the second switching circuit 135 of the second inverter 130. At this time, although not explicitly shown in the figures, the first insulated signal transmitter 123 transmits a signal using the light emitter and the light receiver insulated from each other, or transmits signals between the two insulated terminals using light.

Specifically, the signal may be transmitted to the second terminal from the first terminal when the first terminal that receives the control signal from the first controller 121 and the second terminal that transmits the control signal to the second switching circuit 135 are electrically insulated. For example, the first insulated signal transmitter 123 may include an insulated phototransistor and an insulated photodiode. However, the present disclosure is not limited thereto.

The first switching circuit 125 may control the operation of the first heating coil 112. The first switching circuit 125 may include a plurality of switching elements, and each of the elements may be controlled by a control signal of the first controller 121. For example, the first switching circuit 125 may include an IGBT transistor or a relay switch, but the present disclosure is not limited thereto.

The first power 127 may transmit power to the components included in the first inverter 120. For example, the first power 127 may provide the first controller 121, the first insulated signal transmitter 123, and the first switching circuit 125, with the power, and may provide the first heating coil 112 with the power through the first switching circuit 125.

A second inverter 130 has substantially the same structure as the first inverter 120. Specifically, the second inverter 130 includes a second controller 131, a second insulated signal transmitter 133, a second switching circuit 135, and a second power 137.

The second controller 131 controls the operations of the second insulated signal transmitter 133 and the second switching circuit 135. The second controller 131 may be operated by receiving electric power from the second power 137 different from the first power 127. The second controller 131 may receive information on the state of the first heating coil 112 from the PCB 140.

The second controller 131 controls the second switching circuit 135 to determine whether the second heating coil 112 operates and controls the operating frequency and phase of operation of the second heating coil 112. The second controller 131 may control the operating frequency or the phase of the operation of the second switching circuit 135 based on the information on the state received from the PCB 140, as in the first controller 121.

Further, the second controller 131 may transmit the control signal of the first heating coil 112 to the first switching circuit 125 through the second insulated signal transmitter 133. Accordingly, the second controller 131 may determine whether the first heating coil 112 operates, and may control the operating frequency and the phase of the operation of the first heating coil 112. In this case, the first insulated signal transmitter 123 operates using the control signal of the second controller 131 in preference to the control signal of the first controller 121. Details thereof will be described below.

The second insulated signal transmitter 131 may transmit the control signal received from the second controller 131 to the first insulated signal transmitter 123 of the first inverter 120. At this time, the second insulated signal transmitter 133 may be substantially the same as the first insulated signal transmitter 123.

The second switching circuit 135 may control the operation of the second heating coil 112. The second switching circuit 135 may include a plurality of switching elements and each of the elements may be controlled by the control signal of the second controller 131. For example, the second switching circuit 135 may include an IGBT transistor or a relay switch; however, the present disclosure is not limited thereto.

The second power 137 may transmit the power to the components included in the second inverter 130. For example, the second power 137 may provide the second controller 131, the second insulated signal transmitter 133, and the second switching circuit 135 with the power and may provide the second heating coil 112 with the power through the second switching circuit 135.

Hereinafter, a method of operating the induction heat cooking apparatus according to some embodiments of the present disclosure will be described in detail.

FIGS. 4 to 7 are block diagrams of operation of induction heat cooking apparatuses according to some embodiments of the present disclosure.

Figure 4:
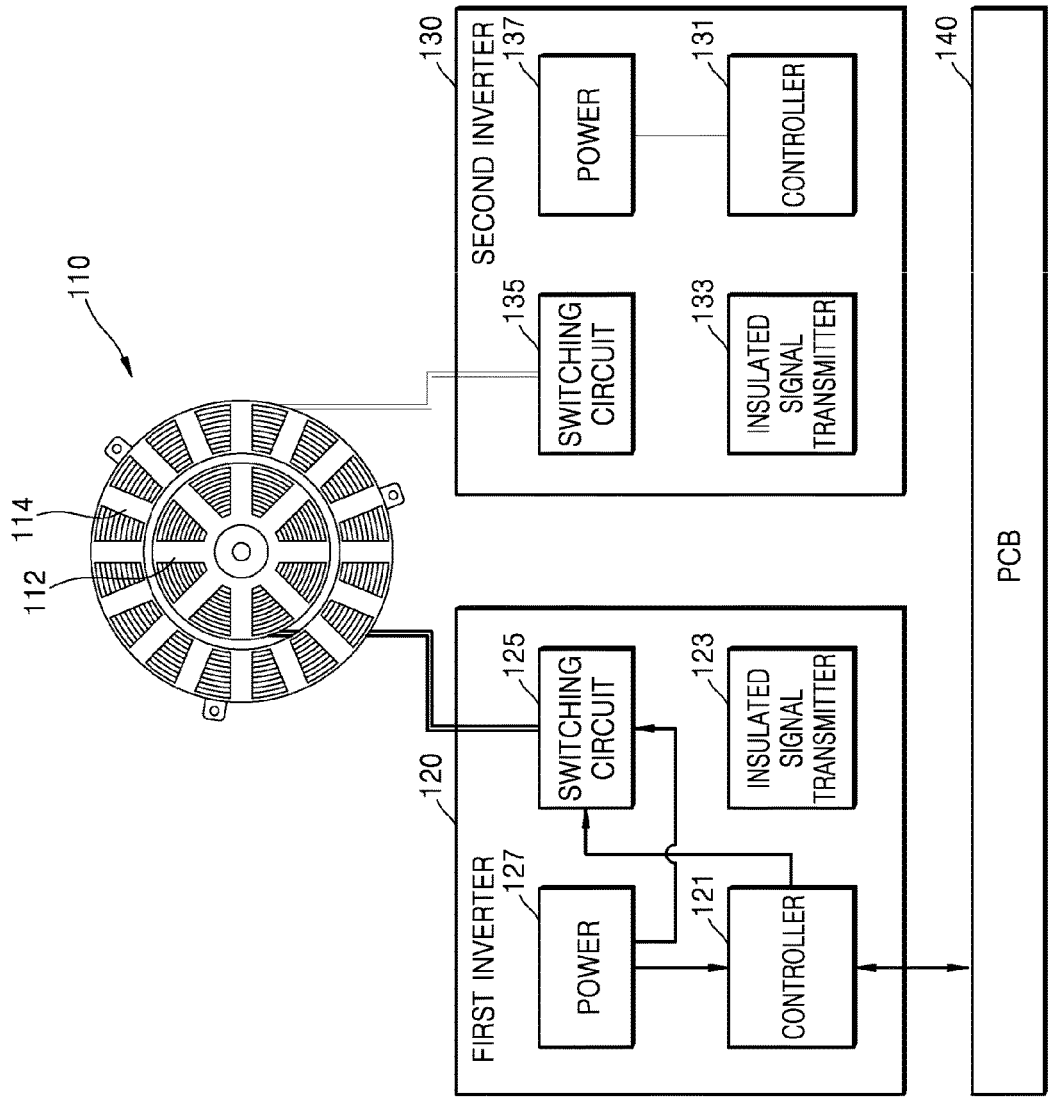
FIGS. 4 to 7 are block diagrams of operation of induction heat cooking apparatuses according to some embodiments of the present disclosure.

FIG. 4 relates to a method of driving an induction heat cooking apparatus that operates only an inner first heating coil 112 in the induction heat cooking apparatus of the present disclosure.

At this time, a first controller 121 of a first inverter 120 receives a driving command from a PCB 140 and transmits a control signal to a first switching circuit 125.

The first controller 121 may receive a control command of a user received from a user interface 30 via the PCB 140. Based on the above, the first controller 121 may determine whether the first heating coil 112 operates, and may adjust the output of the first heating coil 112.

A first power 127 provides the first controller 121 and the first switching circuit 125 with the driving power. At this time, the first power 127 may not provide the first insulated signal transmitter 123 with power, which is not required to be driven. That is, the power is not provided to an unused element, so that the induction heat cooking apparatus may be operated with efficient power consumption.

Although not explicitly shown in the figures, the first controller 121 may transmit information on the operation state of the first heating coil 112 to the PCB 140. The PCB 140 may display information on the operation state of the first heating coil 112 on the user interface 30.

At this time, the second controller 131 of the second inverter 130 is in an idle state, and may receive power required for a standby operation from the second power 137.

Figure 5:
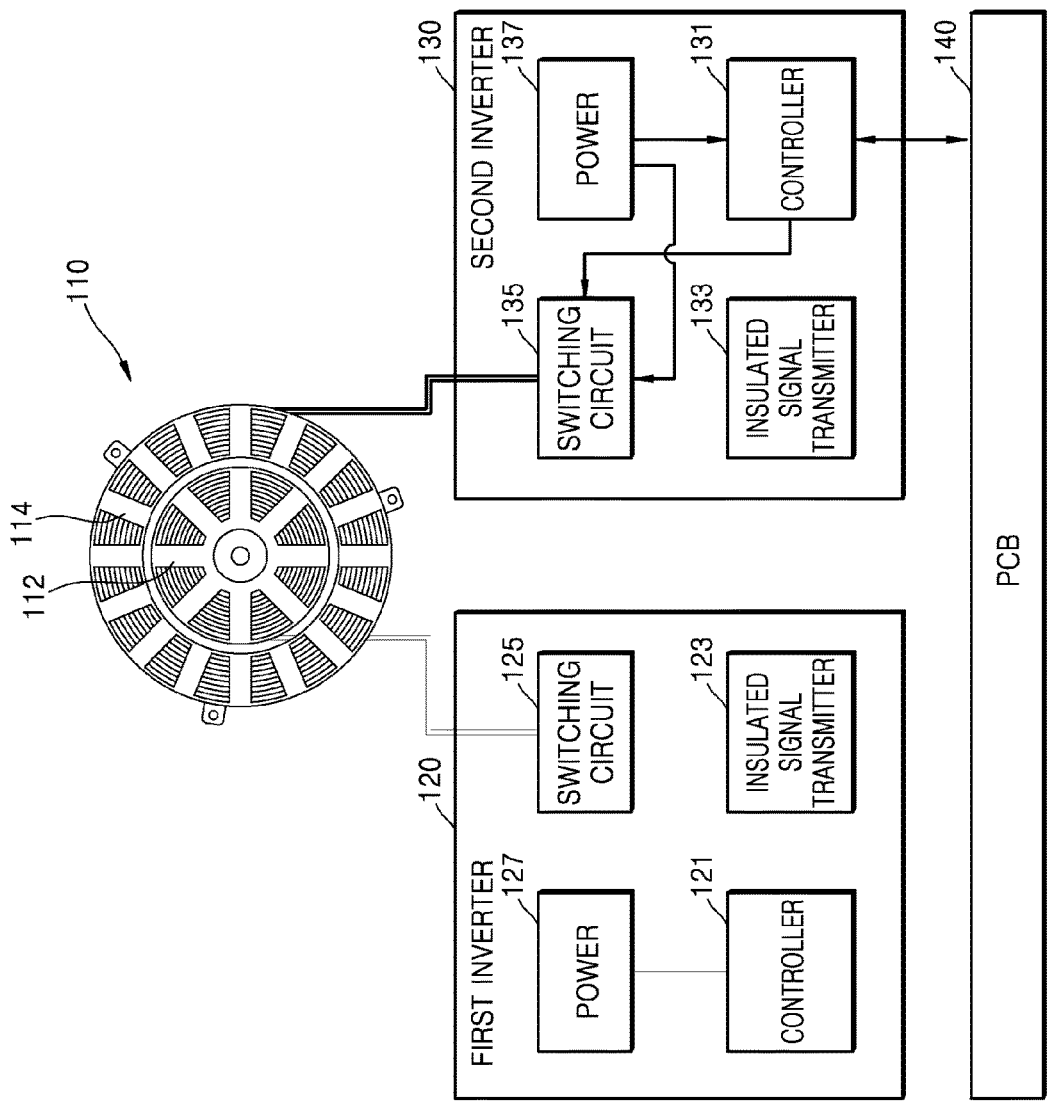

FIG. 5 relates to a method of driving an induction heat cooking apparatus when only an outer second heating coil 114 is operated in the induction heat cooking apparatus of the present disclosure.

At this time, a second controller 131 of a second inverter 130 receives a driving command from a PCB 140 and transmits a control signal to a second switching circuit 135.

The second controller 131 may receive the control command of the user received from a user interface 30 through the PCB 140. Based on the above, the second controller 131 may determine whether a second heating coil 112 operates, and may adjust output of the second heating coil 114.

A second power 137 provides the second controller 131 and the second switching circuit 135 with driving power. At this time, the second power 137 may not provide a second insulated signal transmitter 133 with power, which is not required to be driven. That is, electric power is not supplied to an unused element, so that induction heat cooking apparatus may be operated with efficient power consumption.

Although not explicitly shown in the figures, the second controller 131 may transmit information on an operation state of the second heating coil 112 to the PCB 140. The PCB 140 may display information on the operation state of the second heating coil 112 on the user interface 30.

At this time, a first controller 121 of a first inverter 120 is in the idle state and may receive the power required for the standby operation from a first power 127.

Figure 6:
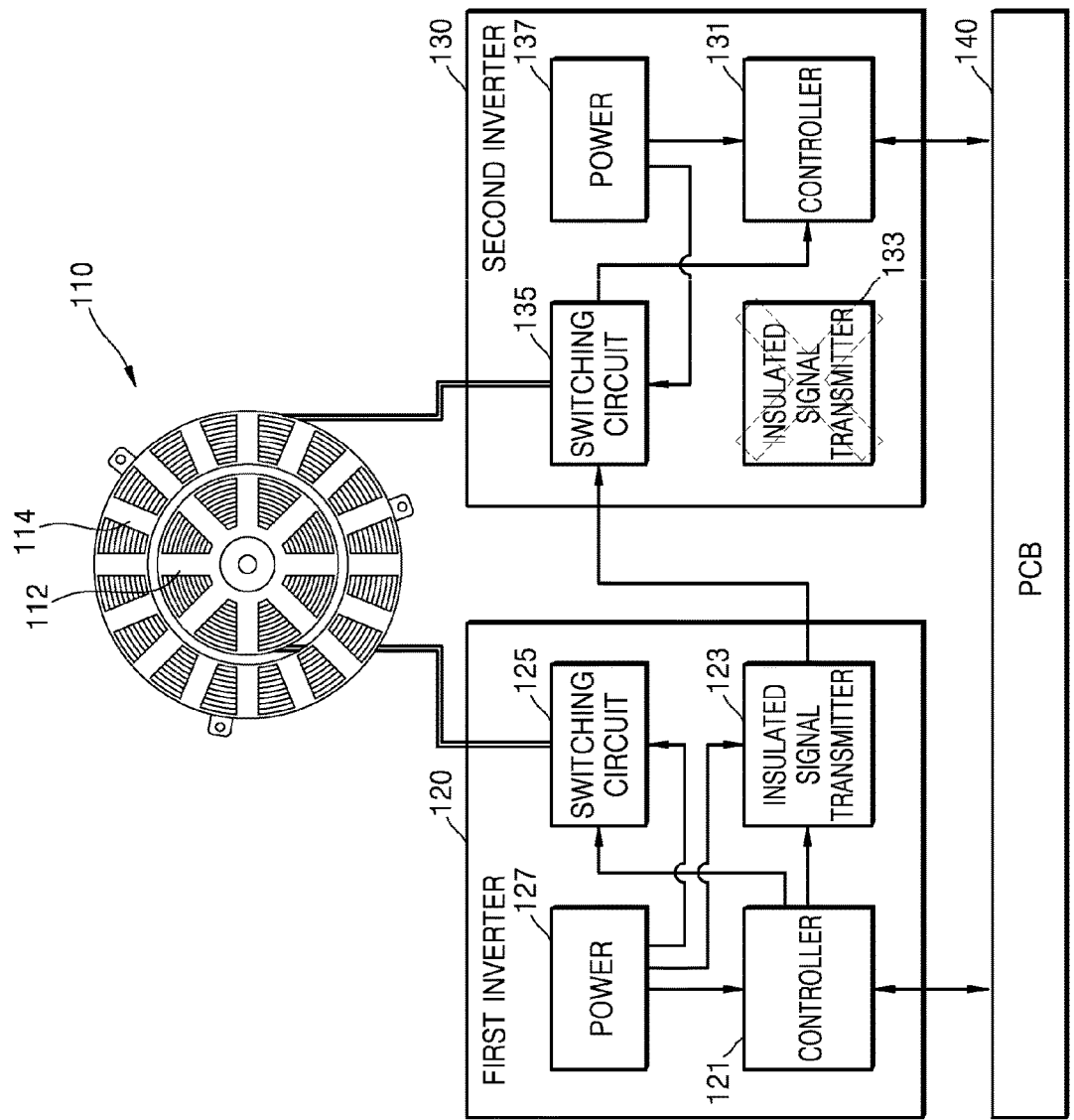

FIG. 6 shows a method of driving an induction heat cooking apparatus when an inner first heating coil 112 and an outer second heating coil 114 are simultaneously operated in the induction heat cooking apparatus of the present disclosure.

At this time, a first controller 121 of a first inverter 120 may have higher priority than that of a second controller 131 of a second inverter 130 and the first controller 121 may control the first heating coil 112 and the second heating coil 114 as a main controller.

Specifically, the first controller 121 of the first inverter 120 may receive the driving command from the PCB 140 and may transmit the signal related to the driving to a first switching circuit 125.

The first controller 121 may receive information whether the second inverter 130 operates through a PCB 140. Specifically, the first controller 121 may receive the information on an operation state and an output state of the second heating coil 114.

The first controller 121 may determine whether the first heating coil 112 and the second heating coil 114 are operating simultaneously based on the information received from the PCB 140.

When the first heating coil 112 and the second heating coil 114 operate simultaneously, the first controller 121 transmits the control signal to a second switching circuit 135 instead of the second controller 131, to match output frequency and output phase of the first heating coil 112 with output frequency and output phase of the second heating coil 114. At this time, the first controller 121 may transmit the control signal to a second switching circuit 135 through a first insulated signal transmitter 123.

As described above, the first insulated signal transmitter 123 may electrically isolate the first inverter 120 and the second inverter 130 and may output the control signal received from the first controller 121 to the second switching circuit 135. Accordingly, the first inverter 120 and the second inverter 130 may operate with different power from each other while minimizing an influence on each other.

At this time, the second switching circuit 135 may receive the electric power from a second power 137 and transmit the electric power to the second heating coil 114. That is, the first heating coil 112 receives the electric power from a first power 127 and the second heating coil 114 receives electric power from the second power 137, so that a maximum output of the induction heat cooking apparatus of the present disclosure may be increased twice compared to a case of using only one power.

At this time, a second insulated signal transmitter 133 included in the second inverter 130 may perform no function, and the second power 137 may not provide the second insulated signal transmitter 133 with the electric power.

The second controller 131 may receive only information on the operation state and output information of the second heating coil 114 from the second switching circuit 135 and transmit the received information to the PCB 140. The PCB 140 may transmit the received information on the second heating coil 114 to the first controller 121.

The second switching circuit 135 may receive a control command from the second controller 131. However, even in such a case, the second switching circuit 135 may operate with high priority to the control command received from the first controller 121. That is, when the second switching circuit 135 receives a control signal from both the second controller 131 and the first controller 121, the second switching circuit 135 may operate based on the control command of the first controller 121 received from the first insulated signal transmitter 123. As a result, in the induction heat cooking apparatus of the present disclosure, operation of the plurality of heating coils may be controlled by a single controller.

That is, as the operations of the first heating coil 112 and the second heating coil 114 are controlled by the first controller 121, the first heating coil 112 and the second heating coil 114 operates with the same frequency and the same phase. Further, the first controller 121 may match a magnitude of output of the first heating coil 112 with a magnitude of output of the second heating coil 114. Further, the first controller 121 may match the phase of the operation of the first heating coil 112 with the phase of the operation of the second heating coil 114 to control the first heating coil 112 and the second heating coil 114 so that the phase deviation does not occur. However, the present disclosure is not limited thereto.

Thus, according to the present disclosure, the induction heat cooking apparatus may eliminate noise generated by a plurality of coils operating at different frequencies from each other and improve the output deviation of the plurality of coils due to phase deviation. Further, the quietness of the induction heat cooking apparatus may be improved, and the output and operation stability of the induction heat cooking apparatus may be improved.

Further, the induction heat cooking apparatus of the present disclosure may operate in the same manner as described above even when the second controller 131 does not operate normally.

That is, when the abnormality occurs in any one of the plurality of inverters, the controller of the normally operating inverter controls the switching circuit included in the inverter in which the abnormality occurs, thereby performing a fail-safe function for the error operation of the inverter. Accordingly, even if the controller of any one of the plurality of inverters fails, the induction heat cooking apparatus of the present disclosure may operate normally and reduce repairing cost, and improve the operational stability of the induction heat cooking apparatus, thereby enhancing satisfaction of consumers.

Figure 7:
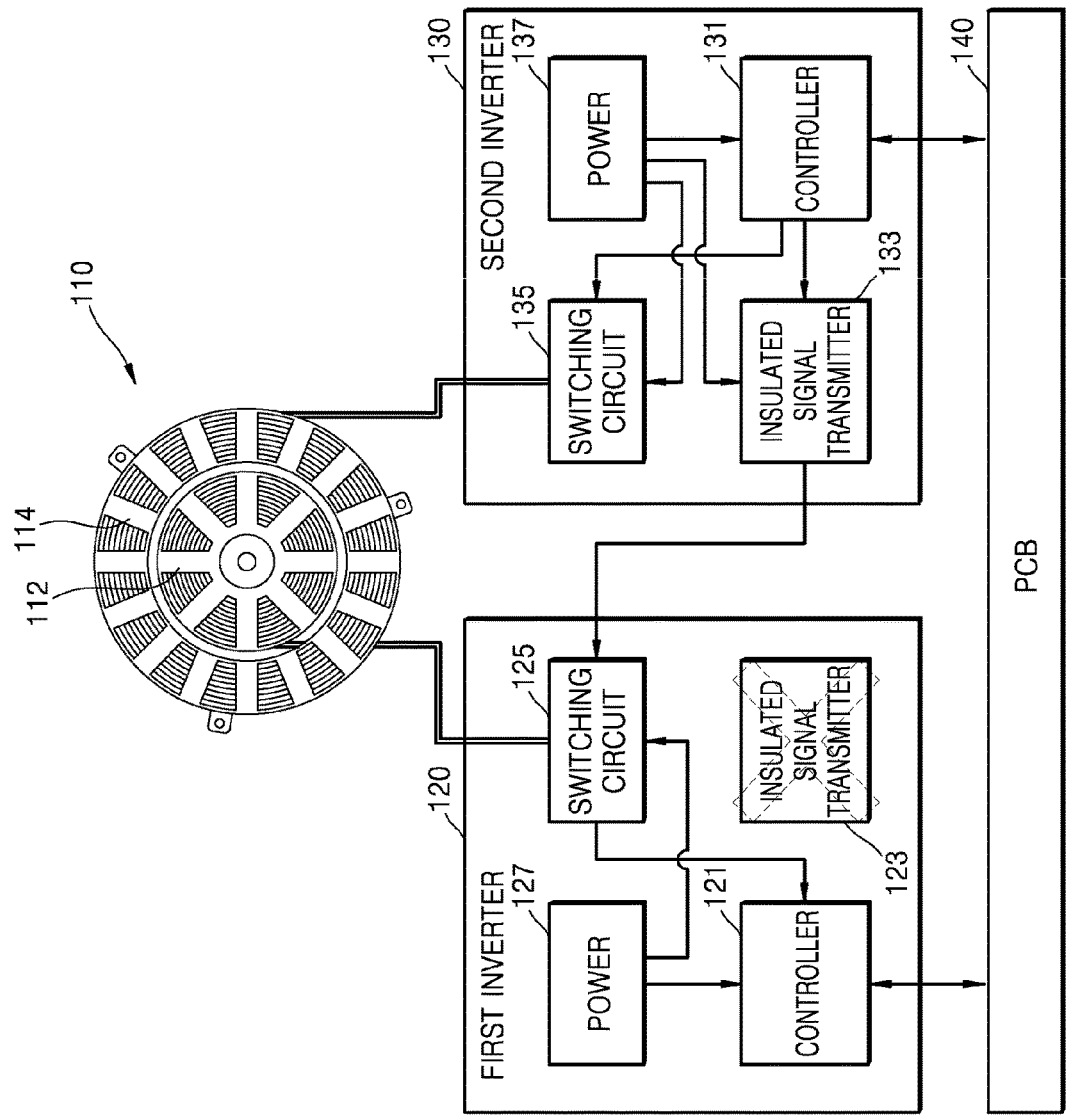

In contrast to FIG. 6, FIG. 7 shows a case in which a second controller 131 controls a first switching circuit 125 and a second switching circuit 135 with higher priority than a first controller 121.

In general, the first controller 121 may have a higher priority than that of the second controller 131. If it is determined that the first controller 121 does not operate normally, the PCB 140 provides the second controller 131 with higher priority than that of the first controller 121, so that the second controller 131 controls both the first switching circuit 125 and the second switching circuit 135.

At this time, the method of operating the second controller 131 may be substantially the same as the method of operating the first controller 121 described with reference to FIG. 6.

Specifically, the second controller 131 receives information on the operation state and the output state of a first heating coil 112. The second controller 131 may determine whether the first heating coil 112 and a second heating coil 114 are operating at the same time based on the information received from a PCB 140.

When the first heating coil 112 and the second heating coil 114 operate simultaneously, the second controller 131 transmits the control signal to the first switching circuit 125 instead of the first controller 121 to match the output frequency and the output phase of the first heating coil 112 with the output frequency and the output phase of the second heating coil 114. At this time, the second controller 131 may transmit the control signal to the first switching circuit 125 through a second insulated signal transmitter 133. A first insulated signal transmitter 123 may perform no operation in a current step.

The first controller 121 may receive the information on the operation state and the output information of the first heating coil 112 through the first switching circuit 125 and may transmit the received information to the PCB 140. The PCB 140 may transmit the received information on the first heating coil 112 to the second controller 131.

The first switching circuit 125 may receive the control command from the first controller 121. In this case, however, the first switching circuit 125 may operate based on the control command of the second controller 131 having a higher priority than that of the first controller 121. Thus, according to the present disclosure, in the induction heat cooking apparatus, the operation of the plurality of heating coils may be controlled by single controller.

That is, as the operation of the first heating coil 112 and the second heating coil 114 are controlled by the second controller 131, the first heating coil 112 and the second heating coil 114 may operate with the same frequency and the same phase.

Thus, the induction heat cooking apparatus of the present disclosure may eliminate noise generated by the plurality of coils operating at different frequencies and improve the output deviation of the plurality of coils due to the phase deviation. Further, the quietness of the induction heat cooking apparatus may be improved, and the output and operation stability of the induction heat cooking apparatus may be improved.

Further, in the induction heat cooking apparatus of the present disclosure, even when the first controller 121 does not operate normally, the second controller 131 may normally operate as a main controller.

That is, according to the present disclosure, when the abnormality occurs in any one of the plurality of inverters, the controller of the normally operating inverter controls the switching circuit included in the inverter in which the abnormality occurs, the induction heat cooking apparatus may perform the fail-safe function for the error operation of the inverter. As a result, even when the controller of any one of the plurality of inverters fails, as it is possible to be normally operated, the repair cost may be reduced and the operation stability of the induction heat cooking apparatus may be improved, thereby enhancing the satisfaction of the consumers.

It is to be understood that the above-described embodiments are to be considered in all respects as illustrative and not restrictive, and the scope of the present disclosure will be indicated by the appended claims rather than by the foregoing detailed description. It is to be construed that all changes and modifications that can be obtained based on the meaning and the scope of claims described below, as wells as equivalents thereof, are included in the scope of the present disclosure.

The invention claimed is:

1. An induction heat cooking apparatus, comprising:
 a first heating coil configured to be operated by a first power;
 a second heating coil that is configured to be operated by a second power different from the first power and that is placed outside of the first heating coil;
 a first inverter comprising a first switching circuit configured to apply the first power to the first heating coil and a first controller configured to control the first switching circuit; and
 a second inverter comprising a second switching circuit configured to apply the second power to the second heating coil and a second controller configured to control the second switching circuit,
 wherein the first inverter further comprises a first insulated signal transmitter configured to transmit a control signal received from the first controller to the second switching circuit, wherein the second inverter further comprises a second insulated signal transmitter configured to transmit a control signal received from the second controller to the first switching circuit, wherein, when the first controller has a higher priority than the second controller and the second switching circuit receives a control signal from both the first controller and the second controller, the second switching circuit operates based on a control signal received from the first controller, wherein, when the second controller has a higher priority than the first controller and the first switching circuit receives a control signal from both the first controller and the second controller, the first switching circuit operates based on a control signal received from the second controller, wherein, when the first controller and the second controller operate without an occurrence of abnormality and the first heating coil and the second heating coil operate simultaneously, the first switching circuit and the second switching circuit operate based on a control signal received from only one controller having a higher priority between the first controller and the second controller, wherein, based on an error occurring in the first controller or the first insulated signal transmitter, the first switching circuit is configured to be controlled by the second controller through the second insulated signal transmitter, and wherein, based on an error occurring in the second controller or the second insulated signal transmitter, the second switching circuit is configured to be controlled by the first controller through the first insulated signal transmitter.

2. The induction heat cooking apparatus of claim 1, further comprising a PCB that is configured to receive information on a state of the first heating coil and a state of the second heating coil, wherein the PCB is configured to receive the information on the state of the second heating coil from the second controller and transmit the received information to the first controller, and configured to receive the information on the state of the first heating coil from the first controller and transmit the received information to the second controller.

3. The induction heat cooking apparatus of claim 2, wherein the first controller is configured to generate a control signal of the second switching circuit based on information on the state of the second heating coil received from the PCB, wherein the information on the state of the second heating coil comprises an amount of current or an amount of output of the second heating coil, wherein the second controller is configured to generate a control signal of the first switching circuit based on information on the state of the first heating coil received from the PCB, and wherein the information on the state of the first heating coil comprises an amount of current or an amount of output of the first heating coil.

4. The induction heat cooking apparatus of claim 1, wherein the first controller is configured to control the first and second switching circuits to produce a magnitude of output of the first heating coil that is the same as a magnitude of output of the second heating coil, and wherein the second controller is configured to control the first and second switching circuits to produce a magnitude of output of the second heating coil that is the same as a magnitude of output of the first heating coil.

5. The induction heat cooking apparatus of claim 1, wherein, when the first controller has a higher priority than the second controller, the second controller and the second insulated signal transmitter are configured to prevent operation, and wherein, when the second controller has a higher priority than the first controller, the first controller and the first insulated signal transmitter are configured to prevent operation.

6. The induction heat cooking apparatus of claim 1, wherein, when the first controller has a higher priority than the second controller, the first controller is configured to control operations of the first and second switching circuits to produce a signal related to an operation of the second switching circuit that does not deviate in phase from a signal related to an operation of the first switching circuit, and wherein, when the second controller has a higher priority than the first controller, the second controller is configured to control the operation of the first and second switching circuits to produce a signal related to an operation of the first switching circuit that does not deviate in phase from a signal related to an operation of the second switching circuit.

7. The induction heat cooking apparatus of claim 1, wherein the first insulated signal transmitter and the second insulated signal transmitter each comprises an insulated phototransistor.

8. An induction heat cooking apparatus, comprising:

a first heating coil configured to be operated by a first power;

a second heating coil that is configured to be operated by a second power different from the first power and that is placed outside of the first heating coil;

a first inverter comprising a first switching circuit configured to apply the first power to the first heating coil, a first controller configured to control the first switching circuit, and a first insulated signal transmitter configured to be controlled by the first controller; and a second inverter comprising a second switching circuit configured to apply the second power to the second heating coil, a second controller configured to control the second switching circuit, and a second insulated signal transmitter configured to be controlled by the second controller, wherein, when the first controller has a higher priority than the second controller and the first inverter and the second inverter operate simultaneously, the second switching circuit is configured to be controlled by the first controller through the first insulated signal transmitter, and the second controller is configured to stop controlling the second switching circuit, wherein, when the second controller has a higher priority than the first controller and the first inverter and the second inverter operate simultaneously, the first switching circuit is configured to be controlled by the second controller through the second insulated signal transmitter, and the first controller is configured to stop controlling the first switching circuit, wherein, when the first controller and the second controller operate without an occurrence of abnormality and the first heating coil and the second heating coil operate simultaneously, the first switching circuit and the second switching circuit operate based on a control signal received from only one controller having a higher priority between the first controller and the second controller, wherein, based on an error occurring in the first controller or the first insulated signal transmitter, the first switching circuit is configured to be controlled by the second controller through the second insulated signal transmitter, and wherein, based on an error occurring in the second controller or the second insulated signal transmitter, the second switching circuit is configured to be controlled by the first controller through the first insulated signal transmitter.

9. The induction heat cooking apparatus of claim 8, wherein, when the second switching circuit is controlled by the first controller, the first controller is configured to match an operating frequency and a phase of operation of the first switching circuit with an operating frequency and a phase of operation of the second switching circuit, and wherein, when the first switching circuit is controlled by the second controller, the second controller is configured to match an operating frequency and a phase of operation of the second switching circuit with an operating frequency and a phase of operation of the first switching circuit.

10. The induction heat cooking apparatus of claim 8, further comprising a PCB configured to receive information on a state of the first heating coil and a state of the second heating coil, wherein the PCB is configured to receive the information on the state of the second heating coil from the second controller and transmit the received information to the first controller, and configured to receive the information on the state of the first heating coil from the first controller and transmit the received information to the second controller.

11. The induction heat cooking apparatus of claim 10, wherein, when the first controller has a higher priority than the second controller, the first controller is configured to determine whether the first inverter and the second inverter operate simultaneously based on the information on the state of the second heating coil received from the PCB, and wherein, when the second controller has a higher priority than the first controller, the second controller is configured to determine whether the first inverter and the second inverter operate simultaneously based on the information on the state of the first heating coil received from the PCB.

12. The induction heat cooking apparatus of claim 10, wherein, when the first controller has a higher priority than the second controller, the first controller is configured to control the first and second switching circuits to produce an output of the first heating coil that is the same as an output of the second heating coil, and wherein, when the second controller has a higher priority than the first controller, the second controller is configured to control the first and second switching circuits to produce an output of the second heating coil that is the same as an output of the first heating coil.

13. The induction heat cooking apparatus of claim 8, wherein the first insulated signal transmitter and the second insulated signal transmitter each comprises an insulated phototransistor.

\* \* \* \* \*